United States Patent Office 3,513,189
Patented May 19, 1970

3,513,189
PREPARATION OF ACETOACETIC ESTERS
Erich Marcus, Charleston, W. Va., assignor to Union
Carbide Corporation, a corporation of New York
No Drawing. Continuation-in-part of application Ser. No.
504,162, Oct. 23, 1965. This application Apr. 5, 1968,
Ser. No. 719,256
Int. Cl. C07c 69/72
U.S. Cl. 260—483                              10 Claims

ABSTRACT OF THE DISCLOSURE

Azabicyclooctane compounds such as DABCO are excellent catalysts for preparing acetoacetic esters from alcohols and diketene. They provide high yields and productivity and result in a minimum of by-product formation as compared to previously used tertiary amines such as triethylamine. Polyhydric and monohydric alcohols having from 1–20 carbon atoms are reacted with diketene in the presence of the catalyst. The products obtained are useful in manufacturing and modifying amide type resinous polymers.

---

The present application is a continuation-in-part application of Ser. No. 504,162, filed Oct. 23, 1965, now abandoned.

The present invention relates to an improved process for the preparation of acetoacetic esters. More particularly, the present invention is concerned with a highly efficacious catalyst for producing acetoacetic esters from alcohols and diketene.

The acetoacetic esters are well known compounds which contain three reactive groups: a carbonyl group, a carboalkoxy group and an activated methylene group. Because of this combination of functional groups, the acetoacetates are a particularly valuable class of chemical intermediates. In particular, they have found use in the synthesis of coumarones, coumarins, pyrimidines, pyrroles and ketohydrobenzenes. They are also useful as intermediates for insecticides, anti-malarials, amino-acids, vitamins and azo-dyes.

The conventional method for preparing the acetoacetic esters has been to react diketene with an alcohol in the presence of a catalyst. A wide variety of catalysts have been used for this reaction including such compounds as sodium hydroxide, sodium alkoxide, hydrogen chloride, sulfuric acid and tertiary amines such as the trialkyl-amines, the piperidines and the picolines. Although some of these catalysts have been used on an industrial scale, none of them have been sufficiently active to provide the desired process efficiency. Higher rates of reaction have been obtained by operation at elevated temperatures, but the undesirable amount of by-product formation which occurred at such temperatures made this measure of questionable value. Consequently, it became necessary to increase the reaction rate by using high catalyst concentrations which, in addition to contaminating both the crude and refined products with catalyst per se, caused the formation of undesirable condensation products that appeared as process residues and contaminants and limited the overall efficiency of the process.

It is an object of this invention to provide a process for the production of acetoacetic esters at rates which are in excess of those which were heretofore obtained.

A further object is to provide a process for the production of acetoacetic esters in high yields and at high productivities.

A still further object of this invention is to provide a process for producing acetoacetic esters with a minimum of by-product formation even when elevated reaction temperatures are employed.

These and other objects will become apparent from the following description and claims.

In accordance with the present invention there is now provided a process for the preparation of acetoacetic esters which comprises contacting diketene and an alcohol in the presence of an azabicyclooctane compound as catalyst.

By the term "azabicyclooctane" as used herein is meant 1-azabicyclo[2.2.2]octane, 1,4-diazabicyclo[2.2.2]octane, or a mono- or dialkyl derivative of either of these compounds. Illustrative of the azabicyclooctanes which are useful as catalysts in the present invention are 1-azabicyclo[2.2.2]octane, 1,4 - diazabicyclo[2.2.2]octane, 2-methyl- or ethyl - 1,4 - diazabicyclo[2.2.2]octane 2,3 - dimethyl-1,4-diazabicyclo[2.2.2]octane, 2,3 - diethyl-1-azabicyclo[2.2.2]octane, 2 - (2 - ethylhexyl) - 1 - azabicyclo-[2.2.2]octane, 2,6 - dioctyl-1,4-diazabicyclo[2.2.2]octane, and the like. The preferred catalysts are 1-azabicyclo[2.2.2]octane, 1,4-diazabicyclo[2.2.2]octane and the alkyl- and dialkyl-derivatives thereof wherein each alkyl group contains from 1 to 8 carbon atoms. The particularly preferred catalysts are 1,4-diazabicyclo[2.2.2]octane and 1-azabicyclo[2.2.2]octane.

The azabicyclooctane compounds are used in catalytically effective amounts. In general, a concentration of from 0.005 to 0.2 percent by weight based on the weight of diketene will be sufficient. A higher concentration, for example, up to 5 percent by weight, can be used if desired although little advantage is obtained by doing so. Excellent reaction rates are obtained when useing concentrations of from 0.01 to 0.05 weight percent of the diketene and such concentrations are thus preferred. It has been found that to obtain reaction rates comparable to those obtained by using the azabicyclooctane catalysts one must use up to 10 times as much of the previously used tertiary amines such as triethylamine.

Any alcohol containing from 1 to 20 carbon atoms may be satisfactorily used according to the present invention. The alcohols can contain any of a wide variety of functional groups other than the hydroxyl group so long as they do not interfere with or alter the course of the alcohol-diketene reaction. Furthermore, ethylenically unsaturated alcohols may be conveniently used. Illustrative of the alcohols contemplated for use are the primary, secondary and tertiary aliphatic alcohols such as methanol, ethanol, propanol, isopropanol, tertiary butanol, 1-pentanol, 2-ethyl-hexanol, decanol, lauryl alcohol, eicosanol, allyl alcohol, methallyl alcohol, 4-penten-1-ol, and the like; cycloaliphatic alcohols such as cyclohexanol, cyclohexenol, cycoheptanol, trimethyl cyclohexanol, and the like; aromatic alcohols such as phenol, the cresols, the xylenols, and the like. Methanol and ethanol are the preferred alcohols.

The alcohol should be used in at least equimolar quantities with respect to diketene. In general, excellent results are obtained by using from 1 to 2 moles of alcohol per mole of diketene. A larger molar ratio, for example, up to 5.0 moles of alcohol per mole of diketene, can be used if desired, although it has been found that this is less economical than the preferred range.

In preparing the alkyl acetoacetates either a batch or a continuous process can be used. When a batch process is employed, it is generally advantageous to dissolve the catalyst in the alcohol and to then add the diketene to the alcohol. By using this procedure unwanted by-products are minimized. The process can also be conveniently conducted by the simultaneous addition of the diketene and an alcohol solution of the catalyst to a common reaction zone and continuously removing a portion of the reaction mixture and separating it into its respective components.

The reaction can be conducted at temperatures of from about 0° C. to 200° C. with temperatures of from about 25° C. to 175° C. being preferred. Although it has been generally understood in the art that temperatures in excess of 70° C. appreciably increase the amount of unwanted by-product, it has now been found that when using the unique catalysts of this invention at a temperature temperature in the range of from 80° C. to 140° C. the amount of by-product formation which occurs is very low and yet an increase in reaction rate is also obtained. This discovery makes the production of alkyl acetoacetates particularly amenable to continuous operation and contributes substantially to the unusually high productivities and consequent economic advantages which accrue from operation according to the present invention.

The present process is generally conducted at atmospheric pressure. Of course, lesser or greater pressures can be used although the the course of the reaction and the amount of product obtained are substantially the same as when ambient pressures are employed.

In some cases, as for example, where it is desired to closely control the temperature of the exothermic reaction, it is advantageous to conduct the reaction in a solvent. Solvents, such as octane, toluene, acetone and ethyl acetate which are inert with respect to the reactants and products of the reaction, can be used. In some cases it is advantageous to use either a large excess of the reactant alcohol or the product itself as the solvent medium. Thus, for example, when preparing ethyl acetoacetate from ethyl alcohol and diketene, a suitable solvent would be either excess ethyl alcohol or ethyl acetoacetate.

In a particularly preferred embodiment of the present invention, methyl or ethyl acetoacetate is produced by continuously feeding to a reactor one stream containing diketene and another stream containing methyl or ethyl alcohol and 1,4-diazabicyclo[2.2.2]octane, the composition and feed rate of the latter stream being such that from 1.2 to 2.0 moles of alcohol are introduced for each mole of diketene and from 0.02 to 0.04 parts by weight of 1,4-diazabicyclo[2.2.2]octane are introduced per weight part of diketene. While maintaining the reactor temperature at from 100° C. to 125° C. most of the excess alcohol is distilled off and recycled and the crude reaction product is withdrawn continuously. Excellent productivity and yield are obtained when using a residence time of from 10 to 30 minutes.

The acetoacetic esters produced in accordance with the present process can be readily recovered by methods known in the art. The product can usually be isolated by distillation although in some cases, such as where the product is a solid, recrystallization may be required. For many purposes the crude reaction product is of sufficient purity that it may be used without any further refinement after the excess alcohol and solvent have been removed.

The following examples serve to illustrate the invention. Unless otherwise indicated, "parts" refers to parts by weight.

EXAMPLE I 108 parts of methyl acetoacetate containing 0.22 part of 1,4-diazabicyclo[2.2.2]octane were introduced into the still of a rectification column having 5 theoretical trays and were heated to 125° C. Enough methanol containing 0.05 weight percent 1,4-diazabicyclo[2.2.2]octane was added to cause the methanol to reflux through the column while maintaining a still temperature of 123° C. and a distillate temperature of 64° C. Methanol containing 0.05 weight percent 1,4-diazabicyclo[2.2.2]octane was then fed to the still at a rate of 111 parts per hour while a separate diketene stream was fed to the still at a rate of 185 parts per hour. Excess methanol was continuously removed by distillation, maintaining a still temperature of 123° C. and a distillate temperature of 64° C., and the liquid level in the still was kept constant by continuous withdrawal of the crude reaction product. The residence time in the still was 24.3 minutes.

The crude reaction product contained 26 weight percent methanol, 0.7 percent methyl-3-methoxy-2-butenoate, 0.8 percent residues, trace amounts of acetone and acetic acid with the remainder being the desired methyl acetoacetate. The yield of methyl acetoacetate was 98 percent. Productivity was 157 pounds of methyl acetoacetate per hour per cubic foot of reactor volume.

EXAMPLE II

This example was conducted in the same manner and under the same conditions as Example I except that the same amount of diketene was fed to the reactor as a solution containing 66 weight percent diketene and 34 weight percent acetone. In a residence time of 24.1 minutes a 95 percent yield of methyl acetoacetate was obtained at a productivity of 146.5 pounds of methyl acetoacetate per hour per cubic foot of reactor volume. The reaction product contained 0.62 weight percent diketene immediately after being withdrawn from the reaction vessel.

EXAMPLE III

This example was conducted in the same manner and under the same conditions as Example II except that the methanol feed stream contained only 0.025 weight percent 1,4-diazabicyclo[2.2.2]octane. In a residence time of 24.5 minutes a 93 percent yield of methyl acetoacetate was obtained at a productivity of 141.5 pounds of methyl acetoacetate per hour per cubic foot of reactor volume. The reaction product contained 2.5 weight percent diketene immediately after being withdrawn from the reaction vessel.

In like manner methyl acetoacetate is produced by using either 1-azabicyclo[2.2.2]octane, 2,6-dimethyl-1,4-diazabicyclo[2.2.2]octane, 2,5-diethyl-1-azabicyclo[2.2.2]octane or 2-methyl-3-ethyl-1,4 diazabicyclo[2.2.2]octane as the catalyst.

EXAMPLE IV

This example is for comparative purposes only and illustrates that a substantially greater amount of a more conventional tertiary amine catalyst is required to obtain results comparable to those of Examples II and III.

The same procedure and conditions as were used in Examples II and III were used here except that the methanol feed stream contained 0.1 weight percent of N,N,N', N'-tetramethyl-butane-1,3-diamine. In a residence time of 24.6 minutes a 90 percent yield of methyl acetoacetate was obtained at a productivity of 136 pounds of methyl acetoacetate per hour per cubic foot of reactor volume. The reaction product contained 5.5 weight percent diketene immediately after being withdrawn from the reaction vessel.

EXAMPLE V

This example was conducted in a manner similar to Example I except the still temperature was maintained at 103° C. instead of 123° C. In a residence time of 23 minutes a yield of 98 percent was obtained. The productivity was 157 pounds of methyl acetoacetate per hour per cubic foot of reactor volume.

In like manner ethanol, isopropanol and 2-ethylhexanol are reacted with diketene to obtain comparable yields and productivities of ethyl acetoacetate, isopropyl acetoacetate and 2-ethylhexyl acetoacetate, respectively.

EXAMPLE VI

This example is for comparative purposes only and, when compared with Example V, illustrates the advantages of using an azabicyclooctane catalyst instead of triethylamine.

The procedure and conditions used in Example V were used except the methanol feed stream contained 0.10 weight percent of triethylamine. In a residence time of 20 minutes and 87 percent yield was obtained. The reaction product contained 9 percent by weight of diketene.

Polyhydric alcohols having from 1 to about 20 carbon atoms may also be used according to the present invention, especially those having from about 2 to about 6 hydroxyl groups such as ethylene glycol, pentaerythritol or sorbitol. Dihydric alcohols that may also be used in this regard include diethylene glycol, the propane, butane, pentene and hexane diols such as 1,3-butane-diol, 1,4-butanediol and the like. Alcohols containing 3 hydroxyl groups that are also suitable for the purpose of the present invention include glycerol, 1,2,6-hexanetriol; 1,1,1-trimethylol propane and 1,1,1-trimethylolethane. The glycol ethers of these various alcohols may also be employed especially the ethers of ethyleneoxide, propylene oxide and butylene oxide or mixtures thereof, glycol ethers of mixtures of these alkylene oxides or the alkylene oxides per se. Specially, a polyethylene oxide glycol ether having a molecular weight of from about 190 to about 210 may be used in this regard. Cyclic polyhydric alcohols that may be used comprise 4,4'-dihydroxydiphenylpropane, 4,4'-dihydroxydiphenylmethane, 4,4' - dihydroxydicyclohexylmethane and bicyclic compounds such as 5,5-di(hydroxymethyl)-2-norbornene. The acetoacetates thus obtained by the reaction of polyhydric alcohols and diketene are used in the manufacture of polyamide resins known in the art obtained by the reaction of polyamines and polycarboxylic acids or lactones. The acetoacetate radicals will react with the amines used in the preparation of these polyamides thereby resulting in a modification of the polymer chain. The polyamides are in turn useful for manufacturing molded items, filaments and the like.

The following example illustrates the use of 1,2,6-hexanetriol according to the method of the present invention.

Preparation of 1,2,6-hexanetriol trisacetoacetate

Diketene (100% purity, 126 g.) is added to a mixture of 1,2,6-hexanetriol (67 g.), DABCO (0.1 g.) and benzene (100 ml.) over a period of 1.5 hours. During this time, the reaction temperature rises from 25 to 88° C. After the addition, the mixture is kept at the same temperature for about 1 hour longer. After cooling, the mixture is extracted with 100 ml. of a 5% sodium bicarbonate solution. The organic layer is separated and washed once with water. After drying over magnesium sulfate and removal of benzene under reduced pressure, a yield of 157 g. (81%) of product is obtained. The structure of the compound was confirmed by infrared and nuclear magnetic resonance analyses.

What is claimed is:
1. In the process for the production of acetoacetic esters the improvement which comprises reacting diketene with from 1 to 2 moles, per mole of diketene, of an alcohol containing from 1 to 20 carbon atoms at a temperature of from 25° C. to 175° C. in contact with from 0.005 to 0.2 percent by weight, based on the weight of diketene, of a compound selected from the group consisting of 1,4-diazabicyclo - [2.2.2]octane, 1 - azabicyclo[2.2.2]octane, and the monoalkyl and dialkyl derivatives thereof wherein each alkyl group contains from 1 to 8 carbon atoms.

2. A process as claimed in claim 1 in which the reaction is conducted in contact with from 0.01 to 0.05 percent by weight based on the weight of diketene, of 1,4-diazabicyclo[2.2.2]octane.

3. A process as claimed in claim 1 in which the reaction is conducted in contact with from 0.01 to 0.05 percent by weight, based on the weight of diketene, of 1-azabicyclo[2.2.2]octane.

4. A process as claimed in claim 1 in which the reaction is conducted at a temperature of from 80° C. to 140° C.

5. A process as claimed in claim 1 in which the alcohol is methanol.

6. A process as claimed in claim 1 in which the alcohol is ethanol.

7. A process as claimed in claim 1 in which the alcohol comprises a polyhydric alcohol.

8. A process as claimed in claim 7 in which the alcohol comprises an alcohol with from 2 to about 6 hydroxyls.

9. A process as claimed in claim 8 in which the alcohol comprises a trihydric alcohol.

10. A process as claimed in claim 9 in which the alcohol comprises 1,2,6-hexanetriol.

References Cited

UNITED STATES PATENTS

| 2,351,366 | 6/1944 | Pohl et al. | 260—483 |
| 2,939,851 | 6/1960 | Orchin | 260—2.5 |
| 2,167,168 | 7/1939 | Boese. | |
| 3,117,156 | 1/1964 | Keller et al. | |

FOREIGN PATENTS 402,411  2/1965  Japan.

LORRAINE A. WEINBERGER, Primary Examiner

V. GARNER, Assistant Examiner

U.S. Cl. X.R.

260—479, 78